United States Patent
Gaspard

[19]

[11] Patent Number: 5,808,280
[45] Date of Patent: Sep. 15, 1998

[54] DEVICE FOR INDUCTION HEATING OF A RECEPTABLE AND PROCESS FOR CONTROLLING SUCH A DEVICE

[75] Inventor: Jean-Yves Gaspard, Saran, France

[73] Assignee: Cidelcem Industries, Lognes, France

[21] Appl. No.: 570,475

[22] Filed: Dec. 11, 1995

[30] Foreign Application Priority Data

Dec. 9, 1994 [FR] France ................................. 94.14818

[51] Int. Cl.⁶ .............................. H05B 6/12; H05B 6/06
[52] U.S. Cl. ...................... 219/624; 219/626; 219/662; 219/675
[58] Field of Search ................................. 219/624, 625, 219/626, 662, 671, 675

[56] References Cited

U.S. PATENT DOCUMENTS

| 2,845,377 | 7/1958 | Seulen et al. | 219/662 |
| 3,275,784 | 9/1966 | Merritt | 219/662 |
| 3,704,357 | 11/1972 | Moulin | 219/671 |
| 4,453,067 | 6/1984 | Karklys et al. | 219/624 |

FOREIGN PATENT DOCUMENTS

| 0 376 760 | 7/1990 | European Pat. Off. | 219/624 |
| 2 672 763 | 8/1992 | France . | |
| 33 32 990 | 3/1984 | Germany . | |
| 3-203187 | 9/1991 | Japan | 219/662 |
| 5-226069 | 9/1993 | Japan | 219/624 |
| WO 93/13634 | 7/1993 | WIPO . | |
| WO 94/05137 | 3/1994 | WIPO . | |

*Primary Examiner*—Philip H. Leung
*Attorney, Agent, or Firm*—Young & Thompson

[57] ABSTRACT

Device for induction heating of cooking receptacles, of the type comprising at least two concentric induction coils supplied by a generator. Each induction coil ($I_1$, $I_2$, $I_3$) is supplied by a separate generator ($G_1$, $G_2$, $G_3$), the number of induction coils being equal to the number of supply generators. A control block (8) effects the independent operation of each supply generator ($G_1$, $G_2$, $G_3$). The control block (8) is adapted to cause to operate according to a sequential order the supply generators ($G_1$, $G_2$, $G_3$) during a detection step of the presence of a load on the corresponding induction coil ($I_1$, $I_2$, $I_3$), starting with the generator ($G_1$) corresponding to the innermost concentric induction coil ($I_1$) and progressing to the outermost concentric induction coil covered by the receptacle (9) to be heated. The supply generators ($G_1$, $G_2$, $G_3$) are identical to each other and have the same nominal power, for the modular replacement of one supply generator by another supply generator of the same characteristics.

7 Claims, 2 Drawing Sheets

DEVICE FOR INDUCTION HEATING OF A RECEPTABLE AND PROCESS FOR CONTROLLING SUCH A DEVICE

FIELD OF THE INVENTION

The invention relates to a device for induction heating of a receptacle, as well as a process for controlling such a device.

BACKGROUND OF THE INVENTION

It is known to heat cooking receptacles by means of induction coils assembled in a cooking plate.

The cooking plates of this type generally comprise an induction winding supplied by means of an inverter with a high frequency current comprised between 20 and 35 kHz. This winding, of relatively flat shape, is disposed below a vitro-ceramic plate or another suitable material adapted to be traversed by the magnetic field produced by the induction winding.

Because of this magnetic field, induced currents arise in all ferro-metallic receptacles disposed on such a cooking plate. These induced currents have the effect of heating the receptacle, by itself, in a manner known per se.

The maximum heating effectiveness is obtained when the diameter of the receptacle is roughly identical to the effective diameter of the cooking plate.

The document EP 0 376 760 describes a cooking plate with induction heating having a maximum efficiency and designed to be able to receive receptacles of substantially different diameters.

This induction heating plate comprises at least two separate induction elements disposed concentrically one about the other and connected in parallel to the terminals of a single supply inverter.

This device is generally satisfactory, but has the drawback of requiring an inverter of high power determined as a function of the induction cooking plate to be supplied.

The document FR 2 672 763 describes a process and device for the control of a cooking plate by induction heating permitting homogeneous transfer of energy toward the receptacle before being heated by induction, whilst giving a considerable reduction of disturbances radiated by the generated magnetic field. In this process, there is used a single supply inverter coacting with a switching block adapted to ensure the selective supply of one or several of the induction coils to: supply periodically a first induction coil for detecting a possible load on the latter; supply, after detection of a load on the first induction coil, the following induction coil to detect a possible load on this latter; and thus sequentially supply a single one or several of the induction coils as a function of the dimension of the detected load whilst continuously detecting the presence of the load on the supplied induction coil.

These known processes and devices are generally satisfactory, but require the use of a single supply inverter of high power, and of a switching block controlled by a circuit comprising treatment means connected to the induction coils so as to receive signals corresponding to the load disposed facing these latter.

SUMMARY OF THE INVENTION

The invention has for its object to improve the heating technique by induction by providing a new induction heating device and a new process for control of this device, economical to install and use, and permitting receiving receptacles of different diameters with a heating efficiency identical to or better than that of the prior art.

The invention has for an object an induction heating device for kitchen receptacles, of the type comprising at least two concentric induction coils supplied by a generator, characterized in that each induction coil is supplied by a separate generator, the number of induction coils being equal to the number of supply generators.

According to other characteristics of the invention:
the device comprises a block for controlling the operation independently of each supply generator;
the control block is for operating according to a sequential order the supply generators during a detection step for the presence of a load on the corresponding induction coil from the corresponding generator to the induction coil the nearest concentrically to the generator corresponding to the induction coil concentrically the outermost covered by the receptacle to be heated;
the control block comprises synchronization means as to frequency and phase of the assembly of the generators corresponding to the induction coils before being simultaneously supplied during a supply step;
the supply generators are substantially identical to each other and have substantially the same nominal power, for modulator replacement of one supply generator by another supply generator of the same characteristics.

The invention also has for its object a process for induction heating of cooking receptacles, of the type comprising the following steps:

a) detecting a physical parameter representative of the size of the receptacle to be heated, b) determining from the physical parameter detected in step a) the induction coils to be supplied, c) controlling the operation of separate generators associated with the induction coils to be supplied determined in step b).

According to other characteristics of the invention:
the physical parameter is detected whilst supplying the generators according to the sequential order from the generator corresponding to the outermost concentric induction coil covered by the receptacle;
the supply of the generators corresponding to the size of the receptacle to be heated is maintained so long as the receptacle to be heated covers the induction coils corresponding to the generators;
the operation of the assembly of the generators corresponding to the induction coils to be supplied is synchronized as to frequency and phase.

BRIEF DESCRIPTION OF THE DRAWINGS

The invention will be better understood from the description which follows given by way of non-limiting example with reference to the accompanying drawings, in which.

DESCRIPTION OF THE PREFERRED EMBODIMENTS

Figure 1:
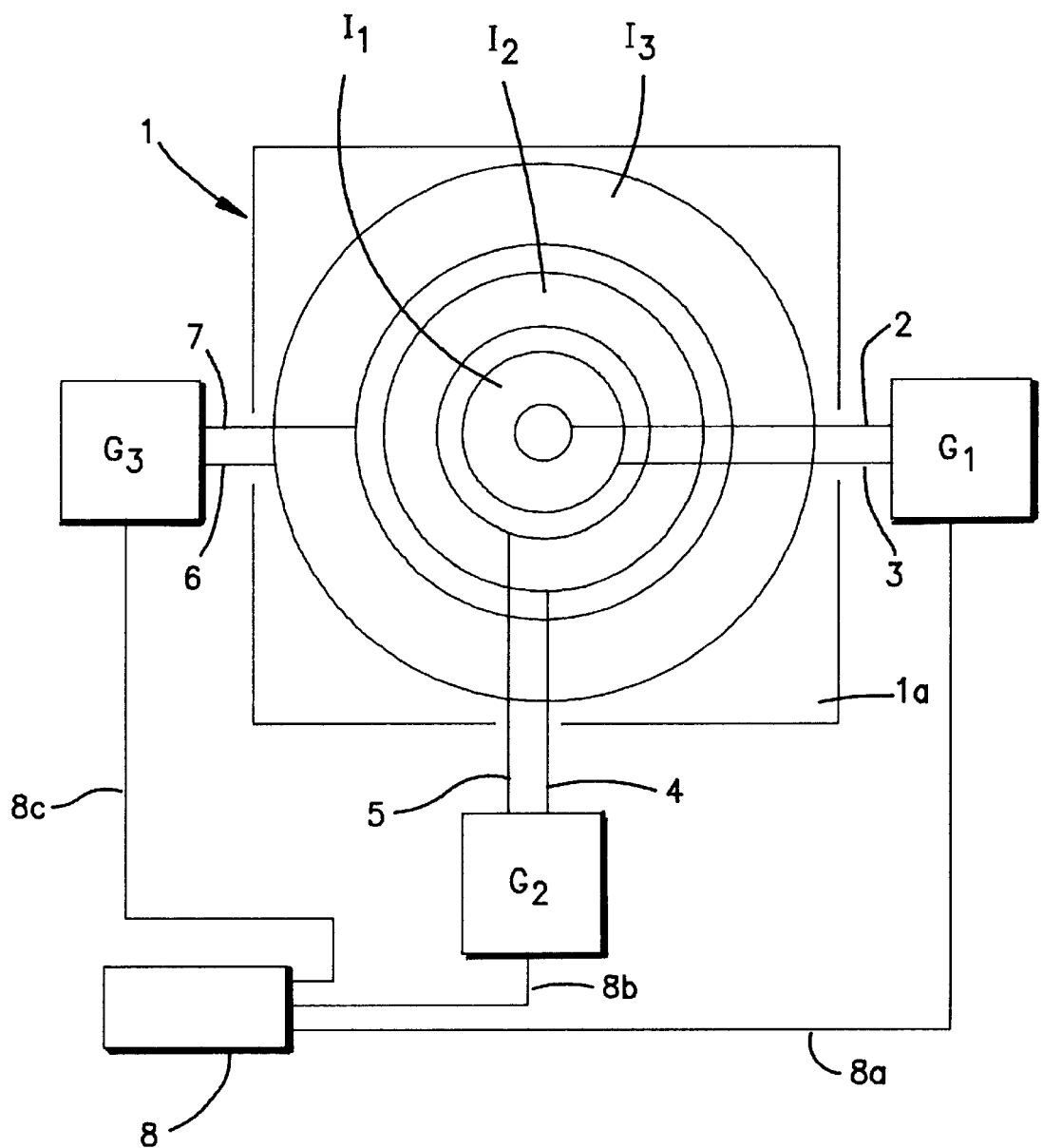
FIG. 1 shows schematically an induction heating device according to the invention.
Figure 2:
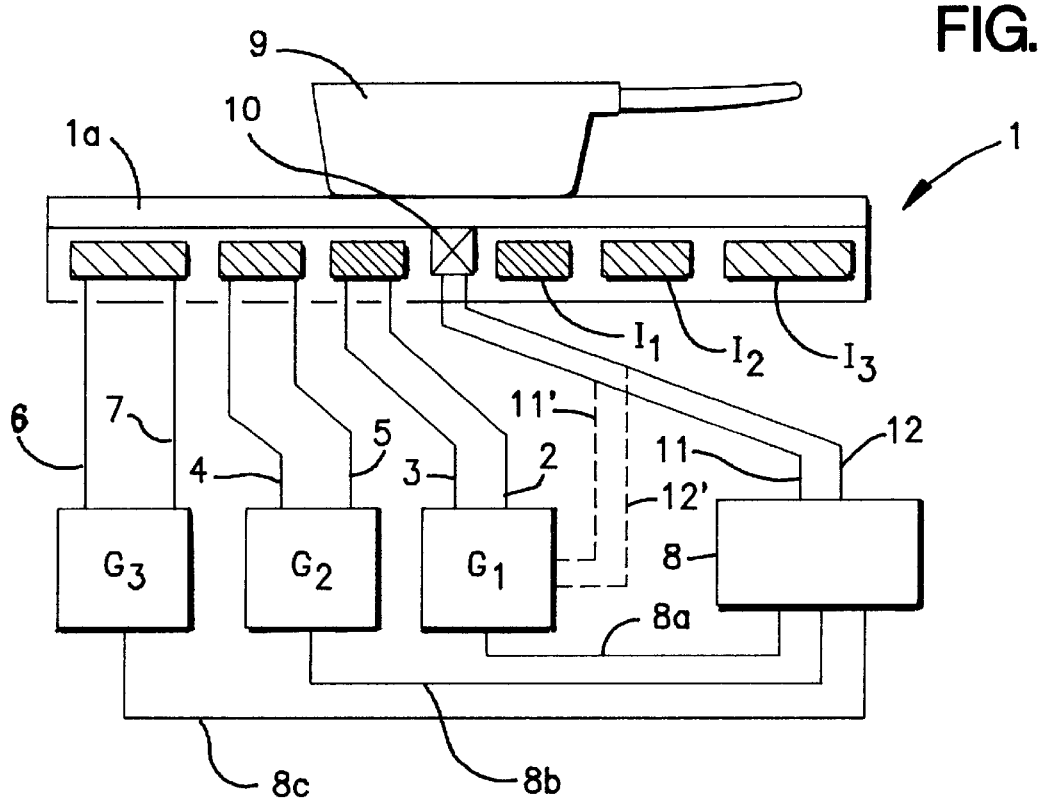
FIG. 2 shows schematically a vertical cross-sectional view of a cooking plate of a device according to the invention, on which is disposed a receptacle of small diameter.

With reference to FIGS. 1 and 2, a device of this type comprises a cooking plate 1 for induction heating comprising a central induction coil $I_1$ and two concentric induction coils $I_2$ and $I_3$ comprised by induction windings of different diameter, these induction coils $I_1$, $I_2$, $I_3$ being supplied by a supply generator.

According to the invention, each induction coil $I_1$ or $I_2$ or $I_3$ is supplied by a separate generator $G_1$ or $G_2$ or $G_3$. Preferably, the control of each supply generator is independent of the control of the other supply generators: thus, each induction coil $I_1$ or $I_2$ or $I_3$ can be operated independently so as selectively to heat a cooking receptacle of ferrous material.

The generator $G_1$ directly supplies the induction coil $I_1$ by means of conductive connections 2 and 3; the generator $G_2$ directly supplies the induction coil $I_2$ by means of conductive connections 4 and 5 and the generator $G_3$ directly supplies the induction coil $I_3$ by means of conductive connections 6 and 7. The invention applied to any number of induction coils greater than two is in no way limited to the example described, but covers all variations comprising any number of induction coils and any number of supply generators, it being understood that each induction coil is supplied by a separate generator and that the number of induction coils is thus equal to the number of supply generators.

Preferably, the supply generators $G_1$, $G_2$, $G_3$ are substantially identical to each other and have particularly the same nominal power: one can thus use standard generators whose power is of the order of 3 kW and thus construct in a modular fashion a device delivering an electrical power corresponding to a multiple of 3 kW.

Another advantage of this arrangement is that it permits the operation in diminished fashion or the modular replacement of a defective supply generator by another supply generator of the same characteristic.

According to an improved modification of the invention, the device comprises a control block 8 for operation of the supply generators $G_1$, $G_2$, $G_3$, which determines as a function of the size of a receptacle 9 (FIG. 2) which will be the induction coils to be supplied.

To this end, the control block 8 is adapted to operate in the manner of a load detector and in a manner to actuate a generator. The control block 8 is connected to each supply generator $G_1$, $G_2$, $G_3$ by a respective bidirectional signal transmission line 8a, 8b, 8c.

Thanks to this control block 8, in a first step the generator $G_1$ is supplied, corresponding to the central induction coil $I_1$, and a determination is made as a function of the current traversing the inductor $I_1$ whether a receptacle 9 is present. The determination of the presence of the receptacle 9 results from processing a load detection signal from the induction coil $I_1$. If a receptacle 9 is detected as being present, we pass on to the second step.

In this second step, a determination is made with the aid of the generator $G_2$ supplying the second concentric induction coil $I_2$, whether the receptacle 9 covers the induction coil $I_2$. This determination takes place also with the aid of a load detection signal obtained by return from the induction coil $I_2$.

If the receptacle 9 does not cover the induction coil $I_2$, the operation of the generator $G_2$ is stopped for a predetermined time, until a new detection step of the load on the induction coil $I_2$, this detection being effected at predetermined time intervals t.

As a function of the number of concentric induction coils present, there are effected thereafter steps similar to the second step described, so as to determine the number of induction coils to be supplied, and the operation of the generators corresponding to the induction coils to be supplied is controlled.

During this determination of the load, the generators $G_1$, $G_2$, $G_3$ are preferably supplied, or others in a sequential order from the generator $G_1$ corresponding to the central induction coil $I_1$, up to the generator corresponding to the concentric induction coil which is outermost and is covered by the receptacle 9: this arrangement avoids the deformation of receptacles 9 and increases particularly their lifetime.

The control block 8 contains a program which determines in regular and sequential manner whether a receptacle is present by means of a physical parameter representative of the size of the receptacle to be heated, this physical parameter being preferably constituted by the detection signal of the load from the induction coils supplied by means of a weak selection signal.

Given that the detection is effected at predetermined regular time intervals t, one is continuously assured that the receptacle has not been removed or replaced by a receptacle of a different size or diameter. The program contained in the control block 8 is provided such that the presence of a receptacle effects the maintenance of the supply of the induction coil covered by the receptacle and that the absence of a receptacle covering the induction coil stops the supply of this induction coil.

In known manner, the cooking plate 1 can comprise below the vitro-ceramic plate 1a or other appropriate material adapted to be traversed by the produced magnetic field, a thermal probe 10 disposed centrally and substantially concentrically to the central induction coil $I_1$. The thermal probe 10 transmits by means of wire connectors 11 and 12 a signal representative of the temperature of the receptacle 9. This signal is received by the control block 8 containing a microprocessor programmable by means of a suitable program defining the heating cycles as a function of the products contained in the receptacle 9.

According to a modification, the thermal probe 10 is connected to the first generator $G_1$ by wire connections 11' and 12' indicated in broken lines in FIG. 2. The signal from the thermal probe 10 is in this case transmitted to the control block 8 by means of generator $G_1$.

Figure 3:
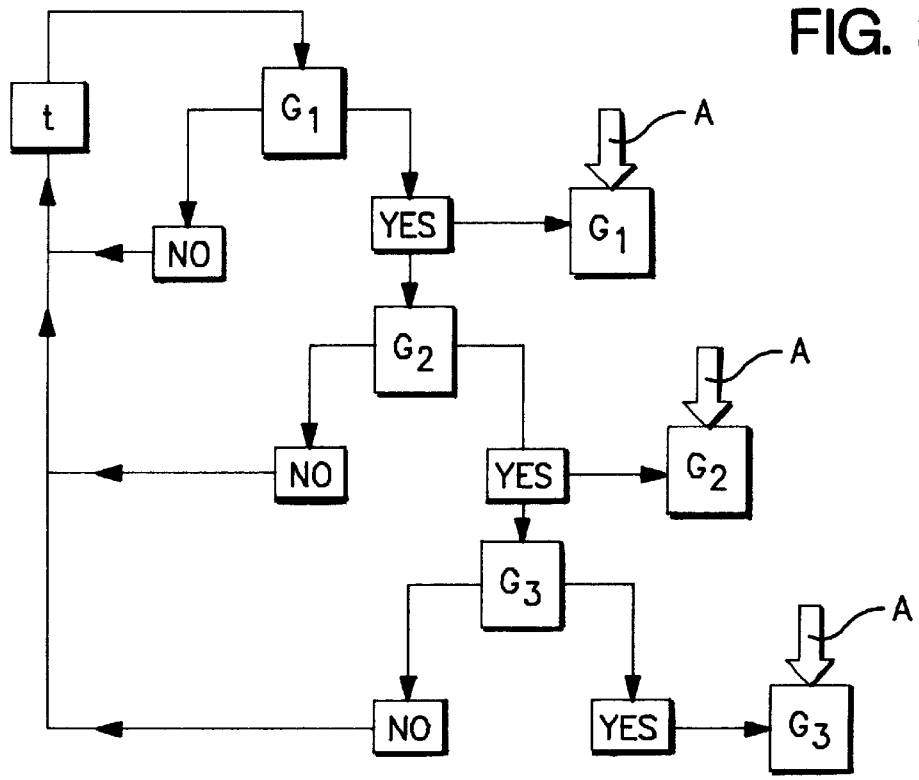
FIG. 3 shows schematically an operational diagram of a control program of a device according to the invention.

With reference to FIG. 3, an induction heating process of a cooking receptacle comprises the following steps:

In a first step, a physical parameter representative of the size of the receptacle to be heated is detected. To this end, the induction coil $I_1$ is supplied by means of the generator $G_1$ with an electric selection signal and there is recovered a load detection signal, which is to say of the presence of a receptacle 9. If a receptacle is present ("YES"), we pass to a second analogous step for the generator $G_2$. However, if no receptacle is present ("NO") on the induction coil $I_1$, the detection is recommenced at the end of a predetermined time t of short duration and of the order of one second.

In the second step, corresponding to the detection on the induction coil $I_2$ following the determination of the presence of a receptacle 9 on the induction coil $I_1$, the generator $G_2$ is supplied with a selection signal and a detection signal of a load is received, permitting to determine whether the receptacle 9 present on the induction coil $I_1$ also covers the induction coil $I_2$. If the receptacle does not cover induction coil $I_2$ ("NO"), the induction coil $I_1$ is supplied by the generator $G_1$.

If the receptacle 9 covers the induction coil $I_2$ ("YES") there is effected an analogous detection step for the generator $G_3$ which is supplied with a selection signal so as to determine whether the induction coil $1_3$ is covered by the receptacle. If the receptacle does not cover the induction coil $I_3$ ("NO"), the induction coils $I_1$ and $I_2$ are supplied simultaneously so as to heat the receptacle by supplying the generators $G_1$ and $G_2$ with a supply A of suitable power.

If the receptacle covers the induction coil $I_3$ ("YES"), the induction coils $I_1$, $I_2$ and $I_3$ are supplied so as to heat the receptacle by simultaneously supplying the generators $G_1$, $G_2$ and $G_3$ with the suitable power supply.

The control block 8 comprises moreover frequency and phase synchronization means of the assembly of generators $G_1$, $G_2$, $G_3$ etc. of the heating device. The synchronization means enter into operation when at least two of the generators must be supplied simultaneously to correspond to a certain size of the receptacle.

As will be seen, the practice of the invention is greatly facilitated by arranging that the generators $G_1$, $G_2$, $G_3$ are substantially identical and have the same nominal operating power.

The invention described with reference to particular embodiments is not thereby limited but covers on the contrary all modifications of shape and all variations of embodiment within the scope and in the spirit of the invention.

What is claimed is:

1. A device for induction heating of a cooking receptacle, comprising:

at least two concentric induction coils;

a separate supply generator directly connected to each of said at least two induction coils;

a control circuit for sequentially and independently operating each supply generator, said control circuit being connected to said each supply generator via a respective bi-directional signal transmission line;

detecting means for detecting a load on an induction coil via said respective bi-directional signal transmission line starting with the generator corresponding to an innermost concentric induction coil and progressing to the generator corresponding to an outermost concentric induction coil covered by the receptacle, said control circuit actuating the generators responsive to said detecting means to power only those induction coils that are covered by the receptacle.

2. The device according to claim 1, wherein the control circuit comprises frequency and phase synchronization means for the generators.

3. The device according to claim 1, wherein the supply generators are identical to each other and have the same nominal power.

4. A process for induction heating of a cooking receptacle, comprising the following steps:

a) detecting a physical parameter representative of the size of the receptacle to be heated, b) determining from the physical parameter detected in step a) which of a plurality of induction coils are covered by the receptacle and are to be supplied with electricity, and c) directly supplying electricity to each of said plurality of induction coils from a respective supply generator so as to heat only the induction coils that are covered by the receptacle, said determining step and said supplying step being performed simultaneously via a bi-directional signal transmission line for each supply generator.

5. The process according to claim 4, wherein said plurality of induction coils are concentric;

said supplying step including supplying the generators sequentially beginning with the generator corresponding to an innermost induction coil, and progressing to the generator corresponding to an outermost concentric induction coil which is covered by the receptacle.

6. The process according to claim 4, wherein the supplying step includes maintaining the supply of electricity as long as the receptacle covers the induction coils.

7. The process according to claim 4, wherein said supplying step includes synchronizing the frequency and phase of the electricity of each generator.

* * * * *

UNITED STATES PATENT AND TRADEMARK OFFICE
CERTIFICATE OF CORRECTION

PATENT NO. : 5,808,280
DATED : September 15, 1998
INVENTOR(S) : Jean-Yves GASPARD It is certified that error appears in the above-indentified patent and that said Letters Patent is hereby corrected as shown below:

On the title page, in the title, Item [54], and col. 1, line 2, change,
RECEPTABLE" to --RECEPTACLE--.

Signed and Sealed this

Twenty-ninth Day of December, 1998

Attest:

BRUCE LEHMAN

*Attesting Officer*     *Commissioner of Patents and Trademarks*